(12) United States Patent
Macallum

(10) Patent No.: US 10,223,929 B2
(45) Date of Patent: Mar. 5, 2019

(54) EVIDENCE BASED DIGITAL TRAINING PORTFOLIO

(71) Applicant: VIQ Solutions Inc., Markham (CA)

(72) Inventor: Malcolm John Macallum, Milton (CA)

(73) Assignee: VIQ Solutions Inc., Markham (CA)

( * ) Notice: Subject to any disclaimer, the term of this patent is extended or adjusted under 35 U.S.C. 154(b) by 358 days.

(21) Appl. No.: 15/247,268

(22) Filed: Aug. 25, 2016

(65) Prior Publication Data

US 2018/0055435 A1    Mar. 1, 2018

(51) Int. Cl.
G06Q 50/22    (2018.01)
G09B 5/02     (2006.01)

(52) U.S. Cl.
CPC .............. *G09B 5/02* (2013.01); *G06Q 50/22* (2013.01)

(58) Field of Classification Search
None
See application file for complete search history.

(56) References Cited

U.S. PATENT DOCUMENTS

| | | |
|---|---|---|
| 6,651,071 B1 | 11/2003 | O'Brien et al. |
| 6,652,287 B1 | 11/2003 | Strub et al. |
| 8,170,465 B2 | 5/2012 | Griffin |
| 8,311,474 B2 | 11/2012 | McAvoy et al. |
| 8,380,121 B2 | 2/2013 | Bradford et al. |
| 8,472,862 B2 | 6/2013 | Yaskin et al. |
| 8,630,957 B2 | 1/2014 | McAvoy et al. |
| 8,666,299 B2 | 3/2014 | Botha et al. |
| 2008/0014569 A1 | 1/2008 | Holiday et al. |
| 2009/0035733 A1* | 2/2009 | Meitar ............... G09B 7/00 434/118 |
| 2012/0082974 A1* | 4/2012 | Shustorovich ......... G09B 5/00 434/429 |
| 2012/0231438 A1* | 9/2012 | Fakhrai ............... G09B 7/00 434/350 |
| 2013/0110737 A1* | 5/2013 | Shustorovich .... G06F 17/30867 705/326 |
| 2013/0137078 A1* | 5/2013 | Shustorovich ......... G09B 7/00 434/362 |
| 2013/0330704 A1* | 12/2013 | Creamer ............... G09B 7/00 434/362 |
| 2014/0227675 A1* | 8/2014 | Budhu ............... G09B 7/02 434/362 |

(Continued)

*Primary Examiner* — Paul A D'Agostino
(74) *Attorney, Agent, or Firm* — Stratford Managers Corporation

(57) ABSTRACT

A system for collecting and evaluating data records comprises a configuration device associated a data collection device associated, and a data monitoring device. The devices are registered with a server. The data collection device transmits a task to the server over a network. The data collection device receives the task from the server and records a data record in response to the task. The data collecting device groups the data record with metadata to produce a verified data record and transmits the verified data record to the server. The data monitoring device receives the verified data record from the server and facilitates the evaluation of the verified data record. The evaluation of the verified data record is used to generate an updated verified data record comprising evaluation results and updated metadata and is transmitted to the server and added to a portfolio.

18 Claims, 2 Drawing Sheets

(56) References Cited

U.S. PATENT DOCUMENTS

2014/0322695 A1* 10/2014 Chaniotakis ............. G09B 5/08
   434/362
2014/0335497 A1* 11/2014 Gal ........................ G09B 7/00
   434/323
2015/0066612 A1    3/2015 Karpoff et al.

* cited by examiner

EVIDENCE BASED DIGITAL TRAINING PORTFOLIO

FIELD OF THE INVENTION

The present disclosure relates to evaluating the performance of students, employees, and professionals using a verified, evidence based approach.

BACKGROUND OF THE INVENTION

Currently the licensing of professionals such as doctors, surgeons, engineers and others, occurs across several years of course curriculum, technique practice and perhaps simulations. In particular, hand-on, practical exams are difficult to assess. These sessions are observed by an examiner or teacher and rated qualitatively by that person. After several years of training and education a paper based record with the cumulative comments of all teachers is submitted to a licensing or certification authority. The decision to grant a license is measured against a set of standards based on the qualitative description of an applicant's training as well as on the quantitative grading system used.

There are several drawbacks of this traditional approach. One drawback is that the authority granting the license or certification may never have actually observed this professional's techniques nor expertise and is basing the decision mostly on the qualitative assessments of the student's teachers and examiners.

Another drawback is that for a class of many students there are likely several different examiners. Each examiner will have slightly different standards and experience and will grade students differently using their own set of different subjective standards.

To ensure consistency and fairness, practical examinations may be recorded or videotaped by various methods. However, this approach has the limitation that it is difficult to ensure the content veracity of the recording. Digital and analog files may be altered and edited and this tampering can be very difficult to detect. Tests, questionnaires, and surveys may be accessed surreptitiously in advance. As well, evaluation results may also be tampered with. To ensure a fair evaluation, a licensing or certification authority must be sure that recordings and results have not been tampered with and that it shows the performance of the actual student performing the procedure or exam on the date indicated.

BRIEF SUMMARY

An exemplary embodiment of the invention includes a system for collecting and evaluating data records. The system comprises a configuration device associated with a first user. The configuration device is registered with a server and transmits a task to the server over a network. A data collection device is associated with a second user. The data collection device is registered with the server and receives the task from the server and records a data record in response to the task. The data collecting device groups the data record with metadata to produce a verified data record and transmits the verified data record to the server. A data monitoring device is associated with a third user. The data monitoring device is registered with the server and receives the verified data record from the server and facilitates the evaluation of the verified data record. The evaluation of the verified data record is used to generate an updated verified data record comprising evaluation results and updated metadata. The data monitoring device transmits the updated verified data record to the server. The server stores the updated verified data record in a portfolio.

In other embodiments of the invention the system, the identity of the configuration device and the first user is verified before allowing the transmission of the task to the server. The identity of the data collection device and the second user is verified before allowing the reception of the task from the server and before allowing the transmission of the verified data record to the server. The identity of the data monitoring device and the third user is verified before allowing the reception of the verified data record from the server and before allowing the transmission of the updated verified data record to the server.

In some embodiments of the invention the metadata comprises a plurality of parameters, the parameters being used to confirm that the verified data record is an accurate representation of the data record.

Data may be divided into a plurality of segments to be transferred between the server and, the configuration device, the data collection device, or the data monitoring device, the receiving device confirms the veracity of each of the plurality of segments as it is received. A first algorithm is used to determine the veracity of each of the plurality of segments and a second algorithm is use to determine the veracity of all of the plurality of segments after all of the plurality of segments have been received.

The metadata may comprise a plurality of parameters, that may be used to confirm that the verified data record is an accurate representation of the data record.

The data record may comprise video recordings that may be used by the third user to evaluate the emotional or the physical state of the second user.

The server may comprise a plurality of content storage locations that implement a distributed file structure wherein the portfolio is stored in more than one of the plurality of content storage locations.

A second exemplary embodiment of the invention 9 includes a method for collecting and evaluating academic performance. The method comprises registering a student and a personal device with a server where the student is associated with the personal device. Also, registering an instructor and an instructor device with the server where the instructor is associated with the instructor device. As well, registering an instructor and a monitoring device with the server where the instructor is associated with the monitoring device. The instructor device combines a task with task metadata to produce a verified task and transmits the verified task to the server. The personal device receives the verified task from the server. The personal device records the performance of the verified task to produce a data record. The personal device combines the data record with data metadata to produce a verified data record and transmits the verified data record to the server. The monitoring device receives the verified data record from the server. The monitoring device is used to record an evaluated data record and combines the verified data record and the evaluated date record with evaluation metadata to produce a verified evaluated data record and transmits the verified evaluated data record to the server. The verified evaluated data record is combined with student results and added to a portfolio associated with the student.

Further embodiments comprise registering an authority and an authority device with the server. The authority is associated with the authority device and the authority device receives the portfolio from the server. The authority device is used to record an overall evaluation of the student's performance. The overall performance is combined with performance metadata and with the portfolio to produce a verified portfolio and is transmitted to the server.

Other embodiments comprise the authority device being used to record an overall evaluation of the instructor's performance. The overall performance is combined with performance metadata to produce a verified instructor evaluation and is transmitted to the server.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
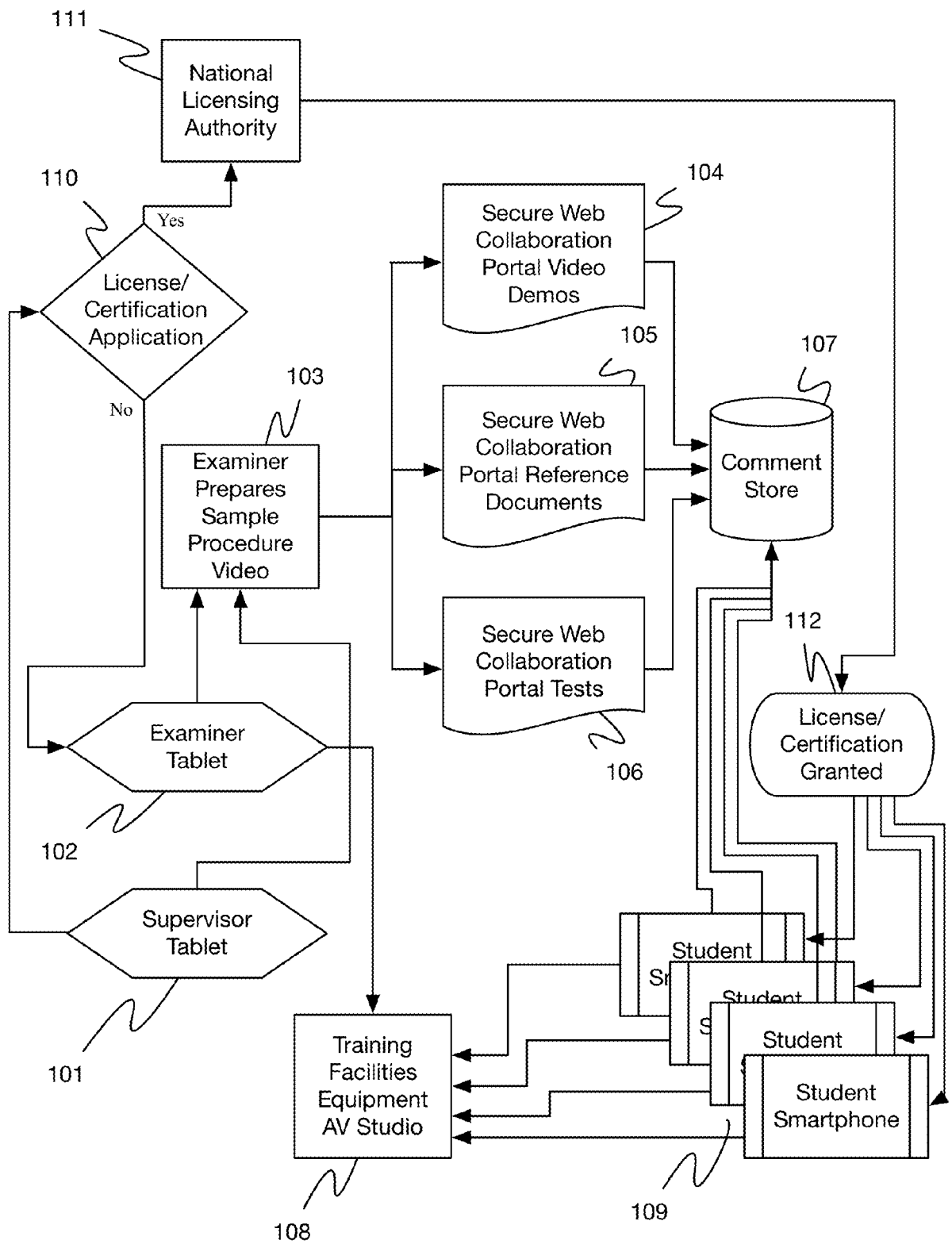
FIG. 1 is a depiction of the workflow process for the analysis of the education and training performance of student enrolled in the program.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Embodiments of the invention are designed to capture the actual demonstration of competency in the execution of a procedures or protocols as described by relevant licensing of and certification authorities. This system captures the evidence or proof required to measure and effectively evaluate a student's success in achieving those performance criteria through data and video analytics of content captured live. The content recorded or captured is used to replace traditional qualitative assessments with replay and searchable content capturing the actual demonstration of procedures or protocols. The system provides a verified and trusted historical record of the training results of an individual or group of students to be collected, saved and reviewed. The system provides actual evidence of student's proficiency in certain techniques and irrefutable evidence of the student's progress. The audio/video content is enrichened with digital data, notes, observations, and other measurements specifically designed to measure and assess the students' performance.

The system provides capabilities to edit and redact the captured content as necessary to best present the key factors within a procedure or protocol. The results are stored in a secure training portfolio and may include digital recorded audio, video, references, text, annotations, and any other type of digital media. The training portfolio also includes permissions and access restrictions, an audit trail and digital signatures to ensure the veracity of the information. This could also be achieved in a number of different ways such as through a file structure or database only version. The key concept to provide all of the evidence of achieving competency in a particular skill is that all of the recorded data is available as a portfolio or unit for submission to the licensing authority.

The portfolio in stored in a secure, confidential manner and may be presented to the licensing or certification authority to provide evidence, with veracity, to the practical skills and performance of an applicant. The authority is able to observe and evaluate the actual techniques developed as if first-hand and thus provide an accurate and consistent mechanism for assessing an applicant's knowledge and technique versus the prior methods. Results may also be observed and regraded at a later date to ensure correctness and fairness. It may also be used to identify and eliminate variations in examiner assessments introduced using a traditional qualitative assessment. A complete grading and test history is also included as well as data analytics for comparisons to other classes, faculties or educational institutions. In embodiments of the invention all of the content is maintained as a single portfolio, it could however be captured as separate files which are then assembled when ready to submit. These files could also be stored on other digital media such as Blu-ray, DVD or other types of digital portable media.

In order to illustrate the exemplary embodiment, FIG. 1 shows an example of the workflow process for the analysis of the education and training performance of student enrolled in the program. The student or students may be students studying a profession studying a discipline that requires hands on practical exams to demonstrate competence. In this embodiment they may be medical students studying a program that may span several years. however, embodiments of this invention may equally apply to any type of student, employee, teacher, professor, driver, pilot, police office, or any type of study or activity that includes a practical component that may have audio, video, or other digital content to be evaluated. It may be used to evaluate the student as well as the authority for fairness and consistency.

In this embodiment there are three roles in the exemplary embodiment; the student, the examiner and the supervisor. Though they will all be referred to in the singular, each or all of the roles, or parties may also be a group of people. The student may be a medical student starting their studies in a multi-year program. The examiner may be one or many instructors and professors who evaluates the written and practical work of the student over the course of their studies. The supervisor is the person or person who will review the evaluation produced by the examiner to determine if the student is successful at their studies and is qualified to practice at the end of the multi-year program. In some embodiments, the examiner or the supervisor role may not be required. In other embodiments the supervisor may also be a licensing or accreditation board.

The student, examiner, and supervisor all interact with the system through specialized software or an app installed on their mobile device. A student will typically access their results through a cellular smartphone that the majority will already own and be familiar with the operation of. Alternatively, the student may choose to access the system using any of a variety of digital devices known in the art including tablets, laptop computers or desktop computers. Students may also download exams, tests, and questionnaires, complete them, and upload the results.

Examiners and supervisors will typically access the system using a tablet or other digital device. Examiners and supervisors may define proprietary assignments, tests, exams, and questionnaires, set permissions, access rights, and security levels and upload them to the secure server.

This includes indicating which students, sections, or classes may assess the material as well as times when the exam may be done, and how long the student has to complete the work. They may also specify the contents of the results such as the requirement to include a video of the procedure, an answered questionnaire, and approval from and examiner.

Referring to FIG. 1, In this depiction, the process begins with the examiner 102 working with the Supervisor 101 to prepare demonstration videos of the intended procedure or protocol to be taught. These Audio/Video demonstrations are captured in an appropriately outfitted room and once captured are edited to exemplify the best technique for performing the procedure or protocol 103. The demonstration audio and videos are submitted with appropriate security credentials and class definitions to the secure web collaboration portal 104 along with reference materials 105 and proprietary tests 106. Specific content is classified with access permissions in such a manner as to only permit students registered in a particular term and class to be able to access the content.

Content is saved in a database 107 including data structures and storage protected by digital security techniques to prevent corruption or access by unknown entities. The database can use any one of many techniques as are known in the art including SQL databases. All access and manipulation of the content is tracked and recorded. The audit trail of actions and events can be reviewed by an administrator securely as required.

Students are provided with a mobile device interface 109, typically a smartphone, that permits secure registration and subsequent access to content utilizing credentials and biometric authentication. For each student, a digital portfolio is setup which is maintained throughout the course of their training and education. This secure digital portfolio contains all data related to the student's program. Students, examiners and supervisors all use appropriately equipped rooms 108 for audio/video capture of sample procedures or execution of protocols. These rooms contain the equipment and tools needed for each to achieve the capture of demonstration procedures or protocol execution as appropriate. It is envisioned that this part of the process could also be achieved by using hand-held video devices to capture practice sessions in any location without necessarily having a purpose built room or facility. Although this would be less effective, it would achieve a similar end.

The registered students using authenticated devices who log on using biometric identification are now able to access the content available on the secure collaboration portal specific to their current term. The student prepares the demonstration procedure audio and video content in the room 108 and edit the results as appropriate and as allowed by the system. The student may also complete an associated test or questionnaire related to the specific procedure or protocol being practiced. The procedure may be repeated multiple times. Once satisfied with results the student submits these materials to the secure collaboration portal 107. The system creates, updates, and maintains a metadata file which is transferred along with the content to preserve the veracity of the submission. The transfer themselves are also protected by encryption techniques as are known in the art.

The examiner 102 is alerted that the student has submitted new content and can review it at any time. The materials submitted by the student are reviewed and a grade is assessed. These grades along with comments, additional reference materials or more sample audio and video content is returned to the secure collaboration portal within the student's portfolio in the database 107. As the volume of content within each student's portfolio reaches a sufficient amount data analytics can be applied. These data analytics use statistical methods to measure the performance of the student against established standards in real-time. A dashboard is presented to the student which can display statistics alerting the student to their performance on a specific procedure or protocol compared with standards, other students, other classes and historical parameters. The student will also know immediately how their performance compares to others. Likewise, the examiner has a dashboard that depicts their class performance against similar statistical measures. These data analytics will also identity students who are falling behind and provide for remedial actions. The Supervisor 101 has a similar dashboard which provides a broader scope across all classes and perhaps the school.

The data analytics provides a statistical mechanism for measuring real-time performance of the student in an educational and training scenario. The benefit of knowing how one is progressing affords both student and examiner to access remedial actions specific to their area of difficulty as soon as it is identified. These educational and training performance measures will substantially improve both the efficiency and effectiveness of training techniques and allow for a much finer degree of detail in assessments backed by audio and video of their performance. This area of data analytics may be used in guiding the performance of the student as they grow more competent, improving their skills to a level acceptable to the institution. The data produced by the data analytics could be generated using numerous algorithms for advanced analyses and much finer guidance of skills competency. This could be achieved with devices designed specifically to capture muscle control, heart-rate, body temperature and perhaps neural activity. These data results could be used to quickly identify if the student is advancing in certain new ways measured when compared with the progress of the best students. Many performance criteria could be used to achieve similar or more detailed training results.

Material and results are added to the student training portfolio until the program has been completed. At this point the student's digital portfolio is assessed by the examiner and supervisor 110 for recommendations on applying for license or certification from the governing body 111. Should they decide to proceed with the application the governing authority is provided with the complete multi-term digital portfolio for each applicant. The governing body now has the opportunity to assess through actual viewing of the student's techniques via the submitted audio and video and other content provide in the student's portfolio. This digital portfolio allows the governing authority to directly assess the skills and performance of the student directly first hand. In this manner the variations introduced by qualitative assessments by third parties is eliminated and a much more robust standard of performance measures applied. Once the governing body has completed its assessment the results 112 are provided and available directly to the student on their registered device. Furthermore, the results may be reviewed later in the case of appeals, remarking, or other review or auditing processes.

The technology depicted in FIG. 1 also ensures that the content produced is captured, transferred, stored, and viewed in a secure manner and is fully audited such that no editing, changing, addition, corruption or access by unknown parties can be perpetrated. Embodiments of the invention provide the veracity required to depend on the student's digital portfolio when reviewing performance, assessing technique, assigning grades or applying for a certification or license as a result of demonstrated performance. This is achieved in part by the technologies, mechanisms and algorithms used to protect the veracity of the content, authenticate the devices, people and authorize the registered participants. To achieve this, every device is registered into the system with a unique system identification code referred to as a node ID. Every participant is also registered into the system with a unique and vetted set of credentials. Every piece of content created is tracked through a collection of parameters or metadata which can be used to demonstrate that the content being viewed is true to the original captured content and has not been corrupted or changed in any way. That auditing tracks every time that piece of content was touched by any process, account, device or program. All content is encrypted during transit and certified to be an exact copy of the original between source and destination. Where appropriate, metadata contains digital signatures and other identifying factors to link credentials to content produced. Maintaining a level of security and data protection is important to authorities relying on the student training portfolio to issue licenses or certifications in a particular skill or vocation. Achieving a level of security sufficient to withstand all potential threats could be achieved in a number of advanced ways. Verification could be included as actual data overlaid on all content such as might be applied on video recordings. The use of time stamps, GPS locations and biometric data could be applied on the actual content and consequently also provide data verification. Other mechanisms could include certification of content using holographic images such as are used on some currencies.

Other sources of data are also used to add digital media to the portfolio. These include audio/video recordings, with the possibility of multiple views being recorded simultaneously. The recording may also be supplemented with real or simulated recordings from medical devices that record respiration, pulse, blood oxygen level, and a number of other devices.

The digital portfolio is stored on a secure server which may be a conventional server or a cloud storage services and may be accessed through any number of wired or wireless communications networks as are known in the art. The secure server may also store course material, tutorial material, schedules, exam papers, assignments, questionnaires. Proprietary or confidential material will be encrypted. It may also store links to other material and databases that store supporting information such as university registrations and course schedules.

The system may be configured with access permissions by a system administrator. The student will be permitted to access their own results. An examiner may access the results of any student for the tests or procedures that they observed or evaluated. Supervisors are able to view the results of any of the students where they are required to evaluate their portfolio to determine their overall success or failure in a program. Dashboards and statistical summaries of results are also accessible to users and will often be customized for the needs and permissions of those individuals. Permissions may be configured and updated by the educational institutions and licensing bodies to meet their needs.

The system utilizes a number of techniques to establish the permissions associated with each party. These are developed to ensure that a student in course during a term program is properly registered and as a result has access to materials and test associated with this particular segment of the course and program given their current stage. Students will have access to all of the materials for a particular segment of their training and education when appropriate and in a timely manner. As a result, the permissions must change as the student progresses through the program. In addition, the permissions are designed in such a way as to allow different versions of some materials to be issued to students in the same course section at the same time. This would be to provide the examiner the ability to have slightly different tests or questionnaires sent to groups of students at the same point within a program. Permissions are also established to provide for students to belong to a group who have the same set of permissions. These permissions could modify search and retrieve parameters to restrict students in one class from retrieve materials provided to another class. The system delivers algorithms that may also restrict the depth of a search parameter to limit the breath of a search from a system perspective.

When the student starts their studies, their preferred digital device will be registered with the system and a digital portfolio is created. Their digital portfolio may initially be populated with digitized versions of their application results. Application results may include, but are not limited to, transcripts from previous program, entrance exam results, letter of reference, and interview results. In the case of non-written material such as an audio recording of a conversation or a video recording for of an interview, a digital audio or video recording will be included in the portfolio.

As the student progresses in their studies, results of course work, assignments, questionnaires, written and practical exams will be digitized and added to the portfolio. At the end of their studies, the portfolio becomes digital evidence of the courses, programs and tests competed, and the skill in all aspects of those studies.

When a practical examination is performed, such as an orthopedic surgeon student demonstrating their surgical technique, the examination may take place in an operating room equipped with video cameras, microphones, and other recording devices. At the start of the exam the student may access the secure server and access instructions, demonstration videos, questionnaires and any other material as specified by the examiner or the supervisor. As the student performs the procedure, it is recorded. Multiple views may be recorded simultaneously such as a view showing the students hands as they perform the procedure and another view showing the entire scene. The recording may also be supplemented with real or simulated recordings from medical devices that record respiration, pulse, blood oxygen level, and a number of other readings. Where allowable, an exam may allow a student to perform a procedure multiple times. The student will be able to review the results of each repetition of the procedure and choose the one to submit for evaluation.

The examiner may observe the procedure live or may view the digital results in another location or at a later time. The examiner will evaluate the student's performance and record a grade together with comments. These comments or notes can be applied while the recording is progressing and could be added to the content as public or private notes. In these cases either private for the examiners use or public such that the student can also see the comments. This type of live note during the demonstration of the procedure would allow for important points to be annotated when they occur during the practice procedure. These notes could be reviewed by either or both Examiner and Student as a way to improve performance the next time in those specific areas. They could also be used as high-quality notes post-practice for reference prior to another attempt. The grade and comments will be combined with the recordings and other metadata such as the student's identity, the time and place or the test and this will be saved in the portfolio. For educational institutions, metadata can also include the course, section and other data and results may be organized and grouped by each course.

Information in the portfolio is often private and proprietary to the student or the institution or licensing body. One example are questionnaires that often accompany practical exams and are often proprietary to the educational institute or hospital that administers the exams. The questionnaire may be downloaded from the secure server to the student's device. Security features of the student's software prevent the copying of the questionnaire and the saving of the questionnaire on the device. Security features that prohibit copying and local storage may include storing the questionnaire only in memory in order to prevent the questionnaire being stored in non-volatile memory on mobile device. Similar results could be achieved by directing the student to log on to another secure web portal specially to view the appropriate test or questionnaire. In this model the proprietary test or questionnaire never leaves the institution's digital domain. Alternatively, this could also be through the inclusion of digital rights associated with the proprietary documents.

Figure 2:
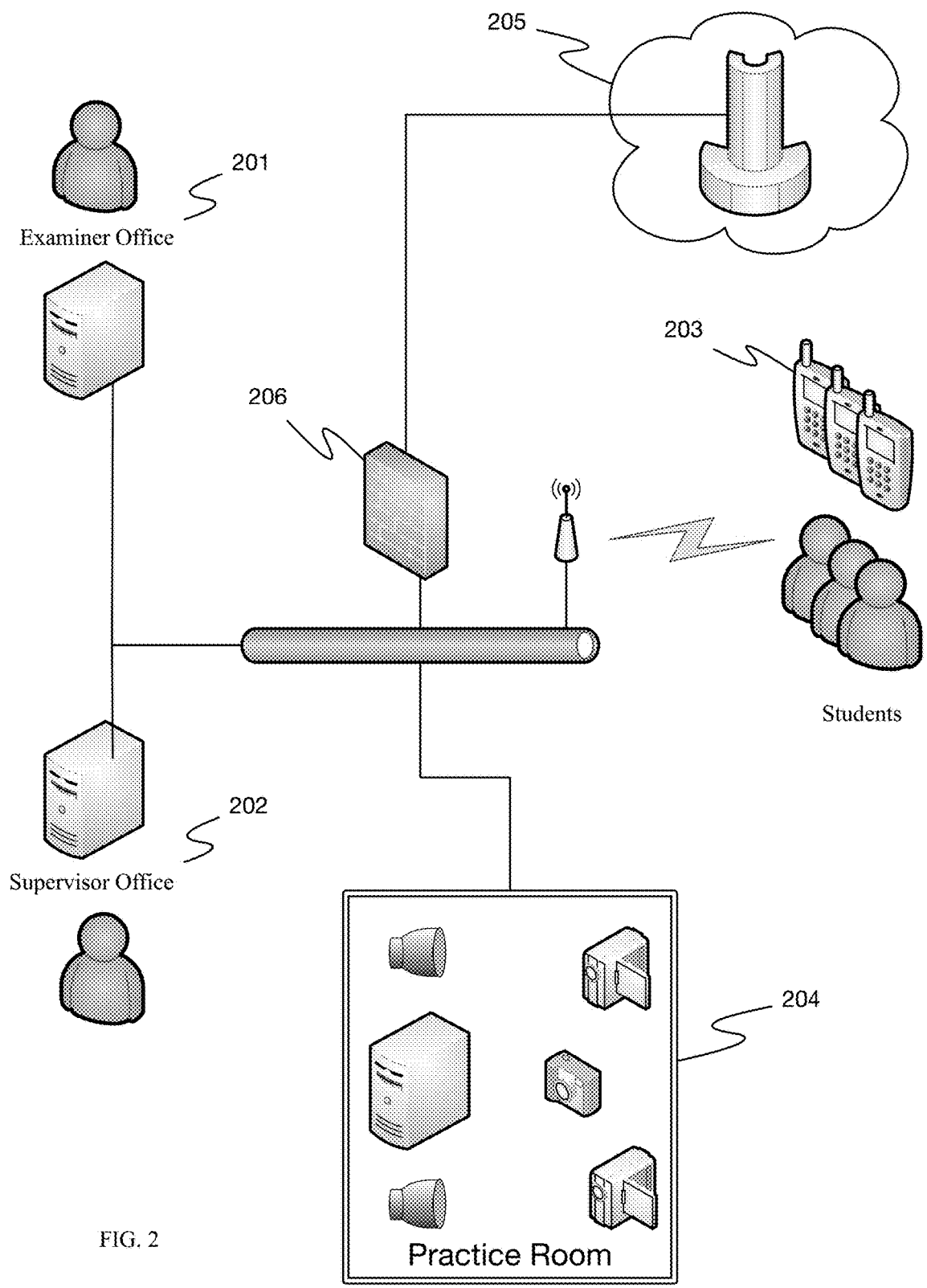
FIG. 2 is a depiction of the purpose-built technology components that make the execution of the workflow possible.

FIG. 2 depicts six primary technologies which work together transparently to execute the workflow and result in a high-quality, advanced and secure digital portfolio of a student's education and training performance.

Computing devices 201, 202 are advanced capture nodes running "satellite" software on tablets, suitably configured laptops, workstation, or other computing devices. These computers run a suite of software solutions designed to capture digital content that includes audio, video, data, text, images and other multimedia. These management stations provide functionality for editing the content, adding content to the captured data, and redacting the content should that be necessary. The satellite workstation provides hundreds of functions for managing precisely how this content is configured and managed longer-term. During the capture of the relevant content the digital data is securely moved in real-time to other content servers 205 for longer-term storage. The local satellite workstation retains the content for a period of time determined by the operator or administrator through a retention schedule feature designed for that purpose. Protective functionality is in place to ensure that content is not deleted until a certified copied is present on a content server. The Examiner 201 and their Supervisor 202 are equipped with compatible satellite workstations to provide the ability to remotely monitor capture events on another node or search for content for performance assessments.

Students registered in this educational and training program are equipped with mobile applications 203 with corresponding interfaces that provide an easy to use, simple, and intuitive program for moving content and collecting results and performance assessments. These devices are also used to access a digital dashboard that uses data analytics to provide statistics regarding their progress in the program from a number of different perspectives. The mobile interface is the primary tool by which the student interacts with the educational training program. This program and device are used to authenticate and authorize the registered student to access and move materials and content as required. Students are authenticated through a number of algorithms including biometric identification, student and node registration parameters, as well as secure credentials. All content is maintained in a secure and separate area of the smartphone 203 and is encrypted in transit. A programmatic algorithm is used to ensure that the correct content is moved to the correct student at the correct time. All content is tracked and sent along with content as it is moved between the student device 203 and the secure collaboration web portal 205. Students, Examiners and Supervisors alike will also use a satellite workstation situated in proximity to the practice room 204. This room is suitably equipped with multiple cameras, microphones and other devices to record and capture their procedural demonstrations. This equipment is used to capture the actual procedure as it is being executed as an example of how it is best done by experts. The practice room would also be used by students to practice and record their effort at the procedure for later submission for performance assessment. Once this content is captured it can be edited and modified as appropriate for submission from the student's mobile device 203. All content which is captured by the system is tracked and data added at every stage regarding its veracity and history. Content is encrypted during transit and is secured when at rest. Options are provided to have data encrypted at rest as well.

Content is moved between the examiner 201, supervisor 202 and student 203 via a secure collaboration web portal and server 205 that ensures that only those parties authorized and authenticated can access the content and that that content is specific to the term that the student is currently enrolled in. This application is designed to provide a secure collaboration experience while providing as much ease of use at any time and from anywhere. This portal is also used to provide materials for the course to the student which would include videos, audio, references and specific tests associated with the student's current stage on the training and education program. These materials could include schedules, practice room assignments, social media items, references, reference materials, notes, instructions, curriculum as well as items of interest relevant to the program registrants.

In order for the system to work the veracity of all digital items stored in the portfolio must be trusted. Users of the system must be sure that nothing has been altered, deleted, added, and that the data is correct. To ensure the veracity of the data stored in the portfolio the system supports a number of features. These include registering and restricting the devices that can access the system, recognizing devices or nodes and specifying the roles of individuals. All digital data is accompanied by secure metadata requirements for ensuring the veracity include a historical audit trail that tracks all creation, additions, edits, deletions, and any other relevant operations on the digital data. These technologies have been developed as a secure and integrated suite of tools that ensure that content, people and credentials are protected at all times. They produce a clear audit trail and clear authentication that the materials submitted are from an authorized participant and that the secure digital portfolio can be referenced as a true representation of the students educational and training performance. Alternately, the use of advanced encryption techniques utilizing two-factor authentication along with a biometrics technique such as iris identification could also be used to maintain a secure package without necessitating the collection of data. With this technique the veracity of the documentation is entirely dependent on the strength of the encryption technologies but also highly dependent on the definition of secure process rules to guide the human interactions.

Designs of these components support the exchange of system metadata to validate the capture, editing, redaction and movement of data between nodes. These exchanges occur as each component establishes a connection to the next to exchange information. The results of that exchange are captured should later examination of the veracity of content be required. This trail of audit data is maintained throughout the life of the digital portfolio such that is legitimacy can be established at any time. Other mechanisms of exchanging data could be used such as secure FTP transfer or secure replication design. These would be less resilient to network failure but would achieve a similar end result.

The system utilizes a synchronization technology that provides a secure mechanism for copying data from one location to another with assurances that the copy is identical to the original. This happens in real-time and includes a number of techniques to ensure that the authenticity of the copy can be established and that the transactions involved in that transfer are recorded. The system begins to transfer packets of data immediately after the beginning of the capture process, which could be within as soon as several seconds. Connections, established for the purpose of synchronization, are authenticated through the use of the system provided node registration ID and other software license parameters. These parameters are verified every time a new connection is established. Once this has been established an encrypted pipe is set up to allow synchronization within a TLS (Transport Layer Security) level pipe. When the encrypted pipe has been established, packets begin to flow to the destination, in most cases a networked server or, cloud server, or cloud storage. A digital signature is established at the origin and at the destination and at frequent periods, these are compared to confirm that the data sent since the last check is identical. This mechanism establishes that the content at the destination so far has not changed from the content at the origin and that synchronization continues properly.

Device registration is a key component for ensuring the security of the system against cyber-threats and certifying that the source of any content can be positively identified. When the system is first implemented and also with any subsequent device additions the transparent management process initiated by central management server software generates a unique node identification signature that is applied when any new device is added. This signature is generated once certain other criteria are confirmed, such as license state, network address, and other relevant parameters. Every generated signature must be unique within a system regardless of how large an installation, geographic location or network segment. Each customer installation has unique identifiers to protect against the same identifier occurring across independent systems. Identifiers are unique to the specific device and expire if and when a device is replaced or retired. These identifiers or codes are confirmed every time a process connects to a specific device for interaction with the system. No secure process will continue if the code confirmation fails. Another design to achieve a similar outcome would require the use of more biometric data to authenticate the user regardless of device used. This would also work but would provide less overall identification data in terms of location, device used or other detail connection parameters.

A separate device or node registration process occurs at initial implementation or anytime a new device is added to the existing system. This registration process provides the "digital signature" necessary for the system to authenticate the device every time a request is made for a process connection. The authentication of the device at each process connection verifies a number of factors including but not limited to, are licenses active and do they permit this connection, are both ends of the connection authorized to make this connection, are both end devices authenticated, what credentials are being used to create this connection and so on.

Audit trails were developed to ensure that should the content being captured be used as proof or evidence, that certain conditions, performance criteria or events took place. By maintaining a history of these for every piece of content the veracity of that evidence would be certified and validated by being able to produce the historical events occurring with a piece of content from the time it is first captured to the time it is used to support the application for a license or certification as a result of professional education or training. Capturing evidence that a professional has performed to a certain set of standards after training and education could be tampered with. Audit trails provide direct evidence that this is or is not the case. These trails are system generated and do not allow for user interaction. A history is maintained with every profile and in some cases is protected with encryption as an additional layer of security. Histories are maintained in multiple places and thus are hard to re-constitute without a detailed knowledge of how that structure is designed. These audit trails are chain-of-custody files in the legal sense as the potential that content could be used in a legal action would require such veracity.

Audio files are recorded in a proprietary format to further protect content from simply using a commercial available player to play content without authorization. It is possible to export this data to a playable format but that is done where authorized users want to review content outside of the system. A record of that event is captured by the system and becomes a part of the audit trail discussed above. The structure of a record is proprietary to the system and must be played using the systems own playback capabilities to occur in a recognizable manner. These proprietary formats can be further protected with at rest encryption technologies. Portfolio records are maintained in numerous locations and structures and must be re-assembled to provide a replay of the content. This is particularly important if replaying only portions of the captured content. Moving to a specific time within the content is done utilizing a novel algorithm coded within the solutions players. The format must cover the multiple different digital components that make up a digital portfolio. It is critical that the audio format maintain a chronologically accurate integration with video, notes, digital signals and other digital data. That integration covers multiple channels of each. The audio format must maintain accurate time encoding such that on replay the portfolio can re-create the same conditions as were observed when the LIVE recording occurred. The format of the audio structure is conducive to this requirement. Because audio tracks are recorded as separate channels and can be recorded as a mix with video the audio files must contain metadata which defines how it relates to other digital data. In this instance the AAC audio produces high quality multi-channel sound and can be combined in various container types including both Apple and Microsoft MP4 containers.

Details on the mobile application are important as the content captured must provide other metadata to prove performance of a procedure or protocol against certain established standards must be protected against unauthorized tampering. At every step from the point of capture to the point where a review is being conducted to access eligibility for a license or certification the system must rely on digital methods and technologies to certify that this evidence of performance being provided in a student's portfolio is true and unchanged from the live capture event. To do that the system must protect and document the capture of content in many ways. Primarily these include the camera, microphone, video, instrument or device being used to capture content to the local recording device. That initial transit must be protected against outside interference and as such an encryption technology is used. Once the content is at the local capture device that content must be protected first while it is resident on the recording device and secondly as it is moved to the local content server called a mid-tier server. While resident on the local recording device it is protected via digital signatures and other credentials. At this time the content is still incomplete and in transition. Once complete is can be protected with at-rest encryption. This content is contained across multiple files and multiple structures and is maintained with rich metadata. Digital signatures are used to certify that the stored content is unchanged from that recorded originally. This solution provides multiple mechanisms for protecting the captured content at every stage during the building of an educational and training portfolio. These mechanisms include the use of tools such as TLS level encryption, SSL, one and two way certificates under a PKI structure, the use of CRC checks and digital signatures and storage mechanism which provides a distributed structure.

Data protection mechanisms provide a level of cybersecurity that allows for content to be securely and safely stored using either private or commercial Cloud technologies for storage. The content can be encrypted using AES-256 or TLS level encryption along with the use of secure pipes using SSL or HTTPS connections provides secure movement of data to and from cloud storage. Furthermore, the audit trail captures all events and actions that occur with the data and as a result the veracity of the content can be maintained regardless of where it is stored. For certain situations the use of secure cloud storage is chosen, particularly where thousands of educational and training portfolios are concerned. The use of the secure collaboration web portal requires that digital content be moved back and forth between examiner, student and supervisor. As a result, that content must be protected regardless of the mechanism used for storage. The use of secure cloud storage also makes sense when looking at long term archive storage of educational and training portfolio's. A particular mechanism that is used to protect the digital content against cyber-threats is the use of a distributed architecture. This provides for creating multiple identical authenticated content storage locations in real-time. This technique is further reinforced by the use of the distributed file structures used to store the content. No one file represents the entire educational and training portfolio to re-constitute the portfolio the systems internal algorithms must be used. At any one time multiple authenticated copies of the digital portfolio will exist across the multi-tiered architecture. Not only does this technique prevent possible corruption but also allows for re-building the content should one location be compromised. These techniques are critical and provide a degree of insurance that the content has veracity and will deliver evidence of the students educational and training performance in certain procedures and protocols should a legal challenge be launched. In some embodiments, the student portfolio could be contained on secure portable media such as a USB key designed specifically for the purpose. In this model the key or device would be physically submitted at each step of the process to the Examiner or Institution as may be appropriate. Although not as seamless a solution, this would offer a secure mechanism for protecting the content when only exposing it to the network when it is connected. A wired or wireless method could be used to access and update the content stored on the device.

Embodiments of the invention are designed to provide deterrent, preventative, detective and corrective controls, ensuring that crucial data is kept private, confidential and secure. Embodiments of the invention provides the educational and training programs greater efficiency, effectiveness and empirical evidence that a student has achieved an acceptable degree of performance. The student's portfolio necessarily also contains a great deal of private and personal information. This invention must guard the content against loss, corruption and access by unauthorized or unknown entities. The solution provides mechanisms that deliver a verifiable degree of assurance that this is the case. Credentials used by authorized users leverage the entities own Active Directory and LDAP services to ensure that credentials have been previously and securely vetted. The registration process for devices and participants applies system level codes which uniquely identify every participant and their devices. The design that includes distributed storage in multiple locations and a file storage structure that is also distributed makes accessing the content much more difficult by external threats without the algorithms used internally to re-constitute that content. The content is authenticated at every stage and protected whether at rest or in transit. Anytime a piece of data is accessed detailed records are kept in the audit trail of when, what, who and how content was accessed. The level of integration of this invention and its workflow design are key factors in being able to provide a secure and unified solution which protects content with degree of veracity acceptable to the justice system.

The workflow, live capture of evidence and proof that a student has achieved the desired level of proficiency offers improvements in the efficiency and effectiveness of the training and education of professionals. To that end the inclusion of techniques and mechanisms for measuring the performance of the student is critical to providing examiners and supervisors with replay and review of the actual procedure or protocol demonstrated by the student. Further the empirical evidence of that progress can be measured in numerous customizable ways as provided by a dashboard component of this solution. This dashboard, whether on a smartphone, tablet, or laptop is specific to the participant's interests. The dashboards present statistical results of data analytics in a way that is conducive to fast and easy interpretation. The real-time nature of these statistics provides a quick way for both student and examiner to understand what progress is being made, to what extent and in comparison on multiple levels. Comparisons could be on a class level, faculty level, institutional level or national level. Knowing exactly where one stands in comparison to classmates makes identifying remedial actions faster and better. The data analytics algorithms can be custom designed to match the criteria of any profession and the performance criteria acceptable to that institution. The content captured over the course of a student's education and training offers numerous opportunities to analyze results against a plethora of data banks. Data analytics of basic information such as grades, averages, means, outliers speed, accuracy, can be measured in great detail. Comparisons generated through the data analytics engine can produce relevant historical trends and project to future performance levels. Although in its infancy the extension of these techniques and algorithms to video analytics offers a natural extension to measuring performance which does not exist today with current professional education and training solutions. The use of video analytics to determine the relative emotional and physical state of a student could be used to determine factors influencing their success. These video analytic techniques can be used to determine whether the execution of a procedure or protocol can be comfortably achieved by the student. This would be particularly true in the training of surgeons or pilots for example. The content captured during the students training and education provides a new level of analysis not offered in traditional and current techniques. The lab notes, training notes or post-operative notes are greatly enhanced and provide much richer content for those learning when compared with traditional techniques. All of these empirical data can are displayed in visually pleasing dashboard displays perfectly relevant to the participant. Today's paper-based or online programs do not and cannot offer the same degree of rich and advanced success factors as does this workflow and technology combination.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A system for collecting and evaluating data records, the system comprising:
   a configuration device associated with a first user, the configuration device being registered with a server and transmitting a task to the server over a network;
   a data collection device associated with a second user, the data collection device being registered with the server and receiving the task from the server and recording a data record in response to the task, the data collecting device grouping the data record with metadata to produce a verified data record and transmitting the verified data record to the server; and
   a data monitoring device associated with a third user, the data monitoring device being registered with the server and receiving the verified data record from the server and facilitating the evaluation of the verified data record, the evaluation of the verified data record being used to generate an updated verified data record comprising evaluation results and updated metadata, the data monitoring device transmitting the updated verified data record to the server, the server storing the updated verified data record in a portfolio.

2. The system of claim 1 wherein the identity of the configuration device and the first user is verified before allowing the transmission of the task to the server;
   the identity of the data collection device and the second user is verified before allowing the reception of the task from the server and before allowing the transmission of the verified data record to the server; and
   the identity of the data monitoring device and the third user is verified before allowing the reception of the verified data record from the server and before allowing the transmission of the updated verified data record to the server.

3. The system of claim 1 wherein the metadata comprises a plurality of parameters, the parameters being used to confirm that the verified data record is an accurate representation of the data record.

4. The system of claim 1 wherein data is divided into a plurality of segments to be transferred between the server and, the configuration device, the data collection device, or the data monitoring device, the receiving device confirming the veracity of each of the plurality of segments as it is received.

5. The system of claim 4 wherein a first algorithm is used to determine the veracity of each of the plurality of segments and a second algorithm is use to determine the veracity of all of the plurality of segments after all of the plurality of segments have been received.

6. The system of claim 1 wherein the metadata comprises a plurality of parameters, the parameters being used to confirm that the verified data record is an accurate representation of the data record.

7. The system of claim 1 wherein the data record comprises video recordings, the video recording being used by the third user to evaluate the emotional or the physical state of the second user.

8. The system of claim 1 wherein the server comprises a plurality of content storage locations, the plurality of content storage locations implementing a distributed file structure wherein the portfolio is stored in more than one of the plurality of content storage locations.

9. A method for collecting and evaluating academic performance, the method comprising:
registering a student and a personal device with a server, the student being associated with the personal device;
registering an instructor and an instructor device with the server, the instructor being associated with the instructor device;
registering an instructor and a monitoring device with the server, the instructor being associated with the monitoring device;
the instructor device combining a task with task metadata to produce a verified task and transmitting the verified task to the server;
the personal device receiving the verified task from the server, the personal device recording the performance of the verified task to produce a data record, the personal device combining the data record with data metadata to produce a verified data record and transmitting the verified data record to the server; and
the monitoring device receiving the verified data record from the server, the monitoring device being used to record an evaluated data record and combining the verified data record and the evaluated date record with evaluation metadata to produce a verified evaluated data record and transmitting the verified evaluated data record to the server, the verified evaluated data record being combined with student results and added to a portfolio associated with the student.

10. The method of claim 9 further comprising:
registering an authority and an authority device with the server, the authority being associated with the authority device; and
the authority device receiving the portfolio from the server, the authority device being used to record an overall evaluation of the student's performance, the overall performance being combined with performance metadata and with the portfolio to produce a verified portfolio and transmitting the verified portfolio to the server.

11. The method of claim 9 further comprising:
registering an authority and an authority device with the server, the authority being associated with the authority device; and
the authority device receiving the portfolio from the server, the authority device being used to record an overall evaluation of the instructor's performance, the overall performance being combined with performance metadata to produce a verified instructor evaluation and transmitting the verified instructor evaluation to the server.

12. The method of claim 9 further comprising:
registering an authority and an authority device with the server, the authority being associated with the authority device; and
the authority device receiving the portfolio from the server, the authority device being used to record an overall evaluation of the instructor's performance, the overall performance being combined performance metadata to produce a verified instructor evaluation.

13. The method of claim 9 wherein the identity of the personal device and the student is verified before allowing the transmission of the verified data record to the server;
the identity of the monitoring device and the instructor is verified before allowing the reception of the verified data record from the server and before allowing the transmission of the verified evaluated data record to the server; and
the identity of the data instructor device and the instructor is verified before allowing the before allowing the transmission of the verified task to the server.

14. The method of claim 9 wherein data is divided into a plurality of segments to be transferred between the server and, the personal device, the instructor device, or the monitoring device, the receiving device confirming the veracity of each of the plurality of segments as it is received.

15. The method of claim 14 wherein a first algorithm is used to determine the veracity of each of the plurality of segments and a second algorithm is use to determine the veracity of all of the plurality of segments after all of the plurality of segments have been received.

16. The method of claim 9 wherein the task metadata, the evaluation metadata, and the data metadata each comprise a plurality of parameters, the parameters being used to confirm that the verified data record is an accurate representation of the data record.

17. The method of claim 9 wherein the data record comprises video recordings, the video recording being used to evaluate the emotional or the physical state of the student.

18. The method of claim 9 wherein the server comprises a plurality of content storage locations, the plurality of content storage locations implementing a distributed file structure wherein the portfolio is stored in more than one of the plurality of content storage locations.

* * * * *